United States Patent [19]

Fachini et al.

[11] 4,222,452
[45] Sep. 16, 1980

[54] POWER STEERING MECHANISM FOR COTTON PICKERS

[75] Inventors: Robert M. Fachini; William D. Lester, both of Memphis, Tenn.

[73] Assignee: International Harvester Company, Chicago, Ill.

[21] Appl. No.: 27,185

[22] Filed: Apr. 4, 1979

Related U.S. Application Data

[63] Continuation of Ser. No. 853,352, Nov. 21, 1977, abandoned.

[51] Int. Cl.³ .......................... B62D 5/06; B62D 61/06
[52] U.S. Cl. ..................................... 180/162; 180/210
[58] Field of Search ............... 180/154, 159, 160, 161, 180/162, 210, 211, 213, 214, 215, 216, 217, 132; 280/62, 92; 91/216 A; 92/110, 111, 117 R, 117 A, 118, 112, 113, 119

[56] References Cited

U.S. PATENT DOCUMENTS

| 577,342 | 2/1897 | Bain | 92/117 R |
|---|---|---|---|
| 2,345,531 | 3/1944 | Ganahl | 91/216 A |
| 2,874,793 | 2/1959 | Wagner | 180/161 |
| 2,964,332 | 12/1960 | Ulinski | 280/111 |
| 3,613,364 | 10/1971 | Goff | 60/455 X |

FOREIGN PATENT DOCUMENTS

| 1107529 | 5/1961 | Fed. Rep. of Germany | 180/161 |
|---|---|---|---|
| 524096 | 6/1940 | United Kingdom | 180/161 |

OTHER PUBLICATIONS

"Chassis 600 Series Cotton Picker", Service Manual GSS-1420 by International Harvestor Co., p. 11.2.

*Primary Examiner*—John J. Love
*Assistant Examiner*—Randall A. Schrecengost
*Attorney, Agent, or Firm*—Dennis K. Sullivan; Neal C. Johnson; F. David AuBuchon

[57] ABSTRACT

Power steering mechanism for a vehicle having a pair of front driving wheels and a rear steerable guide wheel assembly including a vertical pivot shaft pivoted on the vehicle frame, the steering mechanism including an actuating arm attached to the pivot shaft and a double acting hydraulic cylinder with a double ended piston rod, the body of the cylinder being pivotally mounted on the actuating arm and one end of the piston rod being pivotally attached to the vehicle frame.

3 Claims, 3 Drawing Figures

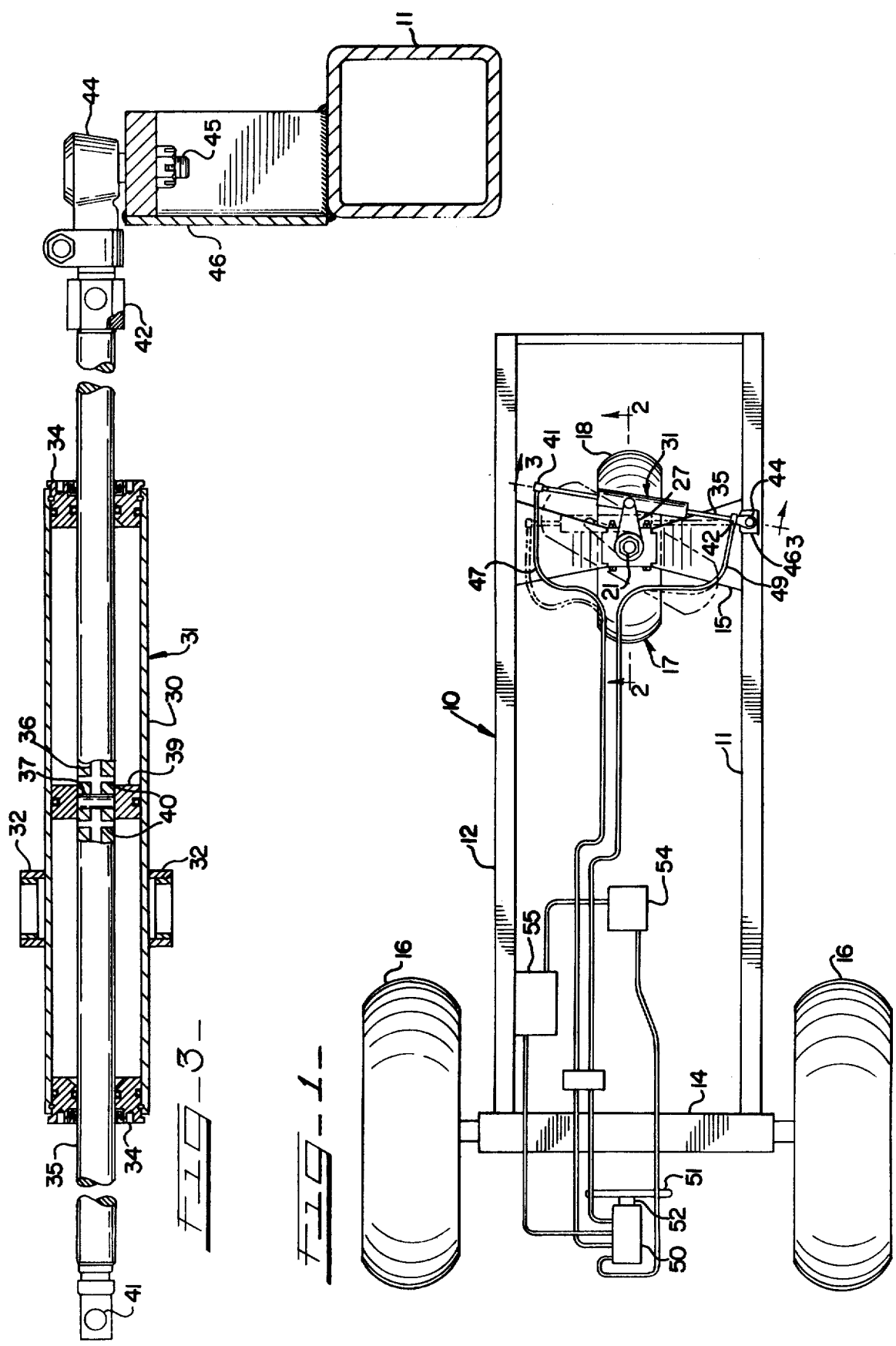

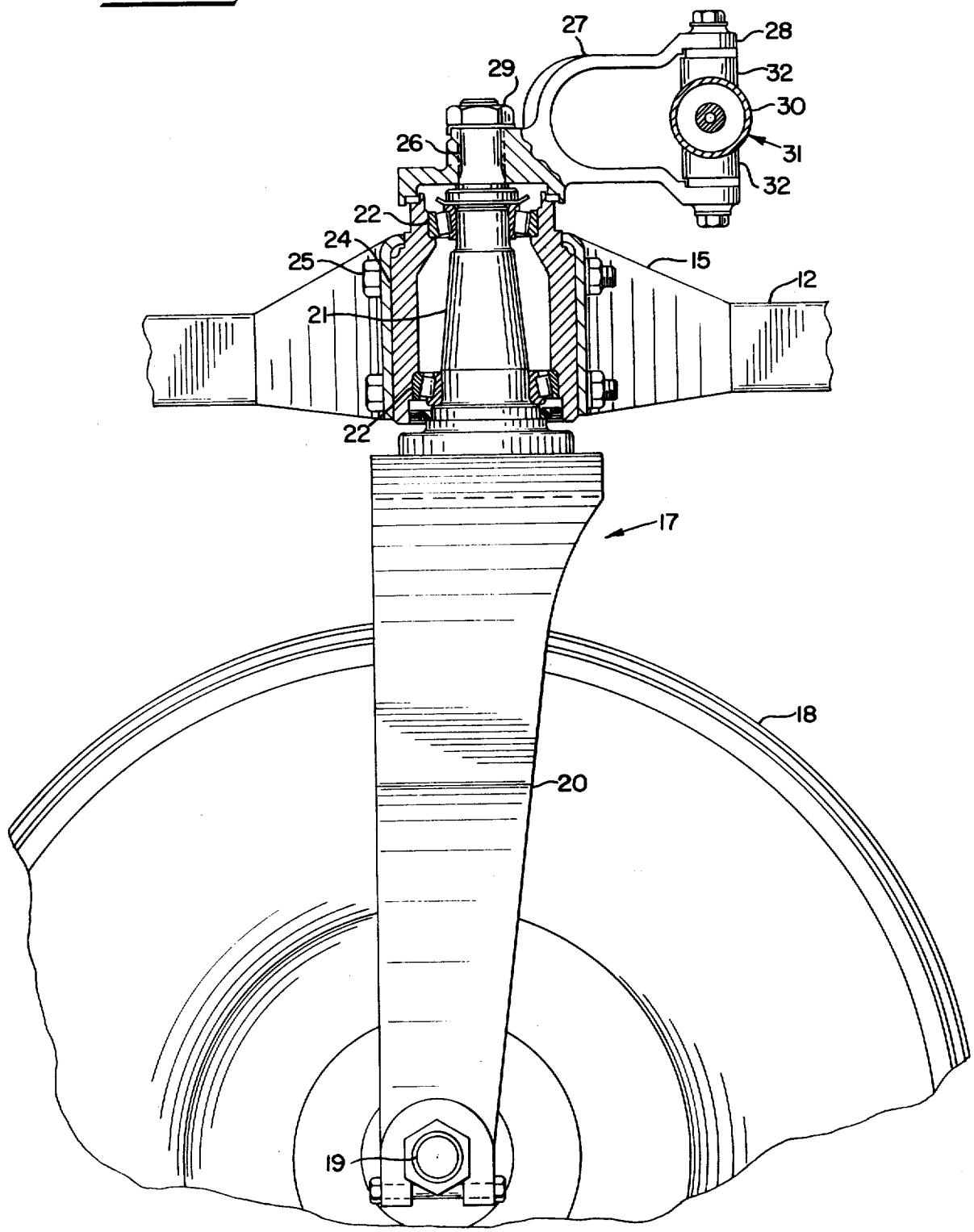

POWER STEERING MECHANISM FOR COTTON PICKERS

This is a continuation, of application Ser. No. 853,352, filed Nov. 21, 1977 and now abandoned.

BACKGROUND OF THE INVENTION

This invention relates to hydraulic power steering systems for vehicles, such as cotton harvesters, of the type having a pair of front driving wheels and a rear steerable guide wheel assembly pivotally mounted to the vehicle frame on a vertical axis, and more particularly, to a simple, economical apparatus for obtaining direct hydraulic control of the steerable wheel assembly.

Vehicles of the type described above have previously been provided with a hydrostatic power steering system wherein a manual gerotor pump is connected directly to the steering wheel in the operator's compartment and hydraulically connected to a frame-mounted reciprocating hydraulic servo-motor comprising a cylinder closed at both ends and having a double-ended piston slidable therein, the piston being provided with a rack type gear which meshes with a pinion gear mounted on the vertical pivot shaft of the steerable guide wheel assembly. One of the desirable characteristics of this system is that even though there is no mechanical linkage between the operator's steering wheel and the steerable guide wheel assembly, the same angular movement of the steering wheel will cause the same proportionate angular movement of the steerable guide wheel assembly in either the left or the right direction. This is because the gerotor pump provides the same output in either direction of rotation thereof and because both ends of the servo-motor cylinder have the same area. While this steering system operates very satisfactorily, the servo-motor and its rack and pinion gearing with the guide wheel assembly pivot shaft are an expensive way of achieving control of the steerable guide wheel assembly.

Accordingly, it is the primary object of the invention described and claimed herein to provide a vehicle of the type described above with a simple apparatus for directly controlling the steerable guide wheel assembly with a hydraulic cylinder while maintaining the same proportional angular relationship between the steering wheel and the steerable guide wheel assembly in either direction.

A more specific object of the invention is to interconnect the vehicle frame and the guide wheel pivot shaft with a control apparatus including a double-rodded, double-acting hydraulic cylinder.

Another specific object of the invention is to provide a means of introducing the hydraulic fluid to the cylinder body in such a manner as to minimize the required amount of movement of the hydraulic hoses supplying fluid to the hydraulic cylinder.

The above objects are specifically met in a steering system for a vehicle having a main frame structure including a transverse beam and a steerable rear guide wheel assembly pivoted on a transversely central vertical axis thereto, the steering apparatus including an actuating arm rotatably coupled with the guide wheel assembly, a double-rodded, double-acting hydraulic cylinder having its cylindrical housing pivotally mounted on the actuating arm and one of the ends of the cylinder rod pivotally mounted to the vehicle frame, and hydraulic means associated with an operator controlled steering wheel for controlling and delivering fluid to the cylinder. The hydraulic cylinder rod is preferably drilled axially from both ends to points just short of the piston thereon and a passage communicates from the axial holes respectively to each of the cylinder chambers. The hydraulic hoses connect to the rod adjacent the pivotal mounting of the rod to the frame and at the free end of the rod.

DETAILED DESCRIPTION OF THE DRAWINGS

Other objects and advantages of the invention will become apparent upon reading the detailed description of the preferred embodiment and upon reference to the drawings, in which:

FIG. 1 is a plan view of the frame of a three wheeled vehicle incorporating the invention, the hydraulic system for steering the rear wheel being illustrated schematically thereon;

FIG. 2 is a longitudinal view, partially in section, of the mounting of the guide wheel and the steering apparatus of the vehicle illustrated in FIG. 1 and taken along the line 2—2 thereof; and FIG. 3 is a longitudinal sectional view of the hydraulic cylinder shown in FIG. 1 and taken along the line 3—3 thereof.

DETAILED DESCRIPTION OF THE PREFERRED EMBODIMENT

Turning to FIG. 1, there is shown a vehicle including a mainframe structure generally designated 10 including left and right fore-and-aft extending side rails 11 and 12 which are interconnected near the front of the vehicle by a transverse beam 14 and near the rear of the vehicle by a transverse bolster beam 15 to form an integral frame structure. Supporting the front end of the frame 10 are a pair of fixed position parallel main drive wheels 16 spaced outwardly of the frame 10, the drive wheels 16 being driven in any suitable manner.

A steerable rear guide wheel assembly, generally designated 17, is pivotally mounted on a vertical axis to the transverse rear bolster beam 15 along the longitudinal center line of the vehicle. As best seen in FIG. 2, the steerable rear guide wheel assembly 17 comprises a guide wheel 18 which is rotatably mounted on a horizontal axle 19, the respective ends of which are attached to the bifurcated lower ends of the vertically extending yoke 20. Fixably mounted to and extending upwardly from the yoke 20 is a vertical pivot shaft 21 which is mounted by bearings 22 in a support casting 24, the support casting 24 sliding into the center of the transverse bolster beam 15 and being retained therein by bolts 25. Thus, the pivot shaft 21 is held rigidly in a right angle position to the bolster beam 15 so that the rear guide wheel 18 supports the frame 10 while being able to turn freely around a transversely central vertical axis.

The pivot shaft 21 protrudes upwardly beyond the top of the bolster beam 15 to a splined end 26 which is engaged by the mating splines of an actuating arm 27, the arm being retained on the shaft by a nut 29. The actuating arm 27 extends radially outwardly from its connection with the pivot shaft 21, preferably in vertical alignment with the guide wheel 18, to a vertically bifurcated distal end forming a yoke 28 in which the cylindrical housing 30 of a double-rodded, double-acting hydraulic cylinder assembly 31 is pivotally mounted, as by trunions 32 attached to the exterior of the housing 30.

As best seen in FIG. 3, the hydraulic cylinder assembly 31 further comprises end plugs 34 which enclose both ends of the cylindrical housing 30 and are appropriately retained and sealed therein. The end plugs 34 are provided with axial openings through which a rod 35 may extend through both end plugs with sufficient length to accomodate the full stroke of the cylinder 31. The rod 35 is provided with an axial hole 36 which extends its full length and a diametral plug 37 is inserted at the middle of the rod 35 to close off the hole 36 thereat to provide two separate passages leading inwardly from the respective rod ends. A piston 39 is shrunkfit on the rod 35 over the plug 37 and the rod 35 is crossed drilled diametrally on either side of the piston 39 to provide passages 40 from the axial passages 36 to the internal portion of the cylinder housing 30. The periphery of the piston 39 is provided with appropriate seal means to prevent escape from fluid around the piston. The ends of the rod 35 are provided with hydraulic hose fittings 41 and 42 for introduction of hydraulic fluid into the axial holes 36.

Beyond the fitting 42, the rod 35 is plugged and threaded on its outside diameter and receives thereon an automotive ball joint 44, the ball end thereof having a shank 45 secured to a bracket 46 welded to and extending upwardly from the longitudinal frame member 11 to a level where the cylinder 31 will be substantially horizontal when attached to the actuating arm 27. Thus, one end of the cylinder rod 35 is pivotally connected to the frame through the ball joint 44 and the other end of the rod is free. Accordingly, when pressurized hydraulic fluid is introduced into the free end of the rod through the fitting 41, it flows through the passages 36 and 40 to the free rod end side of the piston 39, as shown in FIG. 3. Since the piston is attached to the rod 35 which is connected to the frame 11, the cylinder will move along the rod 35 toward the fitting 41, and the trunions 32 will accordingly move the actuating arm 27 and the steerable guide wheel assembly 17, for example, to the position shown in phantom lines in FIG. 1.

Flexible hydraulic hoses 47 and 49 are connected to the hydraulic fittings 41 and 42 respectively on the cylinder rod 35 to accomodate the movement of the cylinder rod 35, as shown in FIG. 1. Hydraulic fluid is supplied and controlled by a conventional hydrostatic steering system including a hydrostatic steerable motor controller or steering hand pump 50 having an operator controlled steering wheel 51 mounted on its operating shaft 52, the steering hand pump 50 being supplied from a engine driven hydraulic pump 54 and dumping into a hydraulic reservoir 55 and having two servo-motor ports which are connected respectively through hydraulic tubing to the hydraulic hoses 47 and 49. Generally the steering pump 50 consists of a positive displacement gerotor metering pump operated by the steering wheel 51 and an axial valve in a valve chamber in communication with the metering pump and the servomotor ports. Movement of the steering wheel actuates the valve and directs pressurized fluid from the engine driven hydraulic pump 54 through the metering pump and valve to one end of the hydraulic cylinder assembly 31 to turn the steerable guide wheel 17 in a direction corresponding to the direction of rotation of the operating shaft and steering wheel 51. Since all of the fluid pressure supplied by the hydraulic pump 54 goes through the metering pump, the amount of fluid supplied to the hydraulic cylinder is directly proportional to the amount of turns of the steering wheel 51. While the above is a general description of the construction and operation of the hydrostatic steering system, those interested in a detailed description of such a system are referred to U.S. Pat. No. 3,613,364 to Raymond L. Goff.

Downstream of the steering hand pump 50, the hydraulic lines 47 and 49 are provided with a double check valve 56. This valve prevents back flow from the hydraulic cylinder to the metering pump in both lines but is opened on both sides when a differential pressure is created in the lines 47 and 49 in either direction by the steering pump 50. Thus, when the metering pump is in a neutral condition, that is, when there is no steering effort demanded, the double check valve 56 hydraulically locks the cylinder assembly 31 and prevents the rear steerable guide wheel assembly 17 from wobbling from side to side.

In operation, when the steering wheel 51 is turned, for example, to the right, the steering pump 50 pressurizes the line 47, opening the double check valve 56 and supplying fluid to the hydraulic fitting 41 on the free end of the cylinder 31. Since the control rod 35 is pivotally mounted to the frame as at 44, the hydraulic cylinder housing 30 moves outwardly on the control rod 35 pulling the actuating arm 27 by the trunions 32 to the right, thus turning the wheel 18 towards the left which will cause the machine to steer to the right. If carried to its maximum limit, the steerable rear wheel 18 and the hydraulic cylinder housing 30 will move to the position shown in phantom in FIG. 1. It will be noted that in this extreme steering postion, the hydraulic hoses 47 and 49 have shifted relatively little compared to the amount of shifting thereof if the hoses were attached directly to the hydraulic cylinder housing 30 in the conventional manner. Moreover, if the rear wheel were turned in the opposite direction, the rod 35 would still move to the same approximate position, shown in FIG. 1 in the extreme, while the cylinder 31 would be near the end of the rod adjacent the hydraulic fitting 42. Thus, the hoses only see the extremes of movement shown in FIG. 1.

Thus, it is apparent that there has been provided in accordance with the invention a power steering mechanism for a three wheeled vehicle which fully meets the objects and advantages set forth above. It is apparent that in view of the foregoing description, many alternatives and modifications will be apparent to those who are skilled in the art. For example, it is apparent that instead of the rod 35 being pivoted to the frame member 11, it could be as easily pivoted to the member 12 and that the actuating arm 27 could be arranged perpendicular to the steerable guide wheel 18 and one end of the rod 35 pivoted on a transverse frame member located forwardly or rearwaardly of the bolster beam 15. Accordingly it is intended to embrace such alternatives and modifications as may come within the scope of the appended claims.

What is claimed is:

1. In a vehicle having a main frame structure, an operator's platform mounted forwardly on said frame structure and including an operator controlled steering wheel, a pair of laterally spaced front driving wheels supporting the forward portion of said main frame structure, a rear guide wheel assembly having a vertical pivot shaft pivotally mounted to a transversely central rearward portion of said main frame structure, and hydrostatic steering means for controlling the position of said guide wheel assembly relative to said frame structure, the improvement wherein said steering means comprises an actuating arm mounted on said pivot shaft for rotation therewith and extending radially therefrom to a bifurcated end, a double acting hydraulic cylinder assembly having a cylindrical housing, said housing having trunnions mounted intermediate the ends thereof on opposite sides thereof in axial alignment, said housing being pivotally mounted on a vertical axis by said trunnions between the bifurcated ends of said actuating arm, said cylinder assembly having a piston slideably mounted in said housing and a rod attached to said piston and extending from both sides thereof to ends external of said housing, one of said external ends of said rod being pivotally attached to said frame structure and the other end being free, said cylinder assembly further including end caps disposed in either end of said housing in sealing relationship with said rod, and a hydrostatic pump attached to and controlled by said operator controlled steering wheel, said hydrostatic pump being hydraulically connected to said hydraulic cylinder assembly and said cylinder assembly being mechanically independent of said pump and said steering wheel.

2. In a vehicle having a main frame, an operator's platform mounted forwardly on said frame and including an operator controlled steering wheel, a pair of laterally spaced front driving wheels supporting the forward portion of said main frame, a rear guide wheel assembly having a vertical pivot shaft pivotally mounted to a transversely central rearward portion of said main frame, and a hydrostatic steering means for controlling the position of said guide wheel assembly relative to said frame, the improvement wherein said steering means comprises a double acting hydraulic cylinder assembly having having a cylindrical housing, said cylinder assembly having a piston slideably mounted in said housing and a rod attached to said piston and extending from both sides thereof to ends external of said housing, one of the external ends of said rod being pivotally attached to said frame structure and the other end being free, an actuating arm having a first end pivotally mounted to the medial portion of said cylindrical housing on a vertical axis intersecting said rod, the other end of said actuating arm being attached to said pivot shaft, and a hydrostatic pump attached to and controlled by said operator controlled steering wheel, said hydrostatic pump being operatively hydraulically connected to said hydraulic cylinder assembly and said cylinder assembly being mechanically independent of said pump and said steering wheel.

3. In a vehicle having a main frame structure, a pair of laterally spaced front driving wheels supporting the forward portion of said main frame structure, a rear guide wheel assembly having a vertical pivot shaft pivotally mounted to a transversely central rearward portion of said main frame structure, and hydrostatic steering means for controlling the position of said guide wheel assembly relative to said frame the improvement wherein said steering means comprises an actuating arm mounted on said pivot shaft for rotation therewith and extending radially therefrom to a distal end, a double acting hydraulic cylinder assembly having a cylindrical housing pivotally mounted on a vertical axis to said actuating arm adjacent said distal end thereof, said cylindrical assembly having a piston slideably mounted in said housing and a rod attached to said piston and extending from both sides thereof to ends external of said housing, one of said external ends of said rod being pivotally attached to said frame structure and the other end being free, said rod further comprising radial passages located adjacent the respective sides of said piston and communicating with the interior portion of said cylindrical housing, axial passages communicating with said radial passages and extending therefrom to the respective ends of said rod external of said housing, and hydraulic fittings disposed adjacent the ends of said rod and communicating with said axial passages, and hydraulic means associated with an operator controlled steering wheel for supplying fluid to and controlling said hydraulic cylinder, said hydraulic means for supplying fluid to said cylinder including flexible hoses connected respectively to said hydraulic fittings.

* * * * *